United States Patent
Jen et al.

(10) Patent No.: US 11,404,025 B2
(45) Date of Patent: Aug. 2, 2022

(54) VIDEO PROCESSING SYSTEM FOR PERFORMING ARTIFICIAL INTELLIGENCE ASSISTED PICTURE QUALITY ENHANCEMENT AND ASSOCIATED VIDEO PROCESSING METHOD

(71) Applicant: MEDIATEK INC., Hsin-Chu (TW)

(72) Inventors: Cheng-Lung Jen, Hsin-Chu (TW);
Pei-Kuei Tsung, Hsin-Chu (TW);
Chih-Wen Goo, Hsin-Chu (TW);
Yu-Cheng Tseng, Hsin-Chu (TW);
Yu-Lin Hou, Hsin-Chu (TW);
Kuo-Chiang Lo, Hsin-Chu (TW);
Chia-Da Lee, Hsin-Chu (TW);
Tung-Chien Chen, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/819,153

(22) Filed: Mar. 15, 2020

(65) Prior Publication Data
US 2020/0327864 A1 Oct. 15, 2020

Related U.S. Application Data

(60) Provisional application No. 62/832,279, filed on Apr. 10, 2019.

(51) Int. Cl.
*G09G 5/00* (2006.01)
*H04N 9/64* (2006.01)
(Continued)

(52) U.S. Cl.
CPC .............. *G09G 5/006* (2013.01); *G09G 5/02* (2013.01); *G09G 5/10* (2013.01); *H04N 9/646* (2013.01)

(58) Field of Classification Search
CPC ............ G09G 5/02; G09G 5/006; G09G 5/10; G09G 2320/02; H04N 9/646; H04N 21/4854; H04N 1/6027
See application file for complete search history.

(56) References Cited

U.S. PATENT DOCUMENTS 9,002,109 B2 * 4/2015 Krishnaswamy .... H04N 1/6027
382/167
2002/0051074 A1 * 5/2002 Kawaoka ........... H04N 5/23241
348/376
(Continued)

FOREIGN PATENT DOCUMENTS

CN 103827956 A 5/2014
CN 107211076 A 9/2017
(Continued)

OTHER PUBLICATIONS

"Thinq AI and Alpha 9 Gen 2 Processor Deliver Whole New User Experience to LG TVS", Jan. 3, 2019.
(Continued)

*Primary Examiner* — Antonio Xavier
(74) *Attorney, Agent, or Firm* — Winston Hsu

(57) ABSTRACT

A video processing system includes an input port and a video processing circuit. The input port obtains device information of a display panel. The video processing circuit obtains an input frame and the device information, configures an image enhancement operation according to the device information, generates an output frame by performing the image enhancement operation upon the input frame, and transmits the output frame to the display panel for video playback.

20 Claims, 7 Drawing Sheets

(51) Int. Cl.
   *G09G 5/02* (2006.01)
   *G09G 5/10* (2006.01)

(56) References Cited

U.S. PATENT DOCUMENTS

| | | |
|---|---|---|
| 2002/0172419 A1 | 11/2002 | Lin |
| 2005/0213665 A1* | 9/2005 | Kyusojin ............. H04N 19/156 375/240.25 |
| 2008/0317358 A1 | 12/2008 | Bressan |
| 2009/0046993 A1* | 2/2009 | Nishio ................... H04N 7/088 386/235 |
| 2010/0073574 A1* | 3/2010 | Nakajima ............ H04N 21/437 348/723 |
| 2013/0135272 A1* | 5/2013 | Park ..................... G09G 3/3233 345/211 |
| 2013/0174208 A1* | 7/2013 | Lee ................... H04N 21/4122 725/109 |
| 2015/0245043 A1 | 8/2015 | Greenebaum |
| 2015/0319416 A1* | 11/2015 | Nakajima ............. H04N 5/765 348/474 |
| 2015/0341611 A1 | 11/2015 | Oh |
| 2015/0378413 A1* | 12/2015 | Tomoda ............. H04N 21/4436 713/340 |
| 2016/0260413 A1* | 9/2016 | You .......................... G09G 5/10 |
| 2016/0335750 A1* | 11/2016 | Usman .................. H04N 19/86 |
| 2016/0366330 A1 | 12/2016 | Boliek |
| 2017/0041881 A1* | 2/2017 | Won .................... H04W 52/223 |
| 2017/0134648 A1* | 5/2017 | Awatani ................ H04N 5/772 |
| 2017/0195722 A1* | 7/2017 | Seo ................. H04N 21/43635 |
| 2017/0310938 A1* | 10/2017 | Okamura ............. H04N 9/3194 |
| 2018/0018932 A1* | 1/2018 | Atkins ................... G09G 5/026 |
| 2018/0061029 A1* | 3/2018 | Suzuki .................. H04N 1/407 |
| 2018/0330473 A1* | 11/2018 | Foi .......................... G06T 7/337 |
| 2019/0028672 A1* | 1/2019 | Ma ........................... H04N 5/50 |
| 2019/0043172 A1 | 2/2019 | Chui |
| 2019/0082177 A1* | 3/2019 | Cho ....................... H04N 19/86 |
| 2020/0066225 A1 | 2/2020 | Atkins |
| 2020/0193647 A1* | 6/2020 | Jeon ....................... H04N 19/85 |
| 2020/0194009 A1* | 6/2020 | Kim ....................... G06F 3/165 |
| 2020/0401889 A1* | 12/2020 | Lee ........................ G06T 5/001 |
| 2021/0035537 A1* | 2/2021 | Shih ...................... G06F 3/1423 |
| 2021/0073957 A1* | 3/2021 | Slabaugh ............... G06T 5/007 |

FOREIGN PATENT DOCUMENTS

| | | |
|---|---|---|
| CN | 107277417 A | 10/2017 |
| CN | 108629747 A | 10/2018 |

OTHER PUBLICATIONS

"Samsung's AI Technology Transforms Any Video Content Into 8K" ,Jan. 15, 2018.

Withers, "Samsung's 2019 TVs are harnessing AI to get smarter, faster",Jan. 7, 2019.

Chang Huang et al., "Incremental Learning of Boosted Face Detector", ICCV 2007, XP055836163, pp. 1-8, IEEE 11th International Conference on Computer Vision, 2007 IEEE, Brazil, 2007.

Liad Kaufman et al., "Content-Aware Automatic Photo Enhancement", vol. 31, No. 8, Computer Graphics Forum, 2012, XP055756964, pp. 2528-2540.

Dawei Li et al., "RILOD: Near Real-Time Incremental Learning for Object Detection at the Edge", SEC 2019, Nov. 7-9, 2019, XP081492458, pp. 1-14, Arlington, VA, USA.

Yu Murata et al., "Automatic Image Enhancement Taking into Account User Preference", 2019 International Conference on Cyberworlds (CW), 2019, XP033644915, pp. 374-377, 2019 IEEE.

* cited by examiner

VIDEO PROCESSING SYSTEM FOR PERFORMING ARTIFICIAL INTELLIGENCE ASSISTED PICTURE QUALITY ENHANCEMENT AND ASSOCIATED VIDEO PROCESSING METHOD

CROSS REFERENCE TO RELATED APPLICATIONS

This application claims the benefit of U.S. provisional application No. 62/832,279, filed on Apr. 10, 2019 and incorporated herein by reference.

BACKGROUND

The present invention relates to picture quality enhancement, and more particularly, to a video processing system for performing artificial intelligence assisted picture quality enhancement and an associated video processing method.

A picture quality (PQ) engine may be implemented in a television chip for applying image enhancement to input frames to be displayed on a television screen. However, a conventional PQ engine provides limited quality adjustment flexibility, and needs manual re-calibration for different display panels. Thus, there is a need for an innovative video processing design which is capable of referring to device information of a display panel for automatically and adaptively configuring a PQ enhancement operation.

SUMMARY

One of the objectives of the claimed invention is to provide a video processing system for performing artificial intelligence assisted picture quality enhancement and an associated video processing method.

According to a first aspect of the present invention, an exemplary video processing system is disclosed. The exemplary video processing system includes an input port and a video processing circuit. The input port is arranged to obtain device information of a display panel. The video processing circuit is arranged to obtain an input frame and the device information, configure an image enhancement operation according to the device information, generate an output frame by performing the image enhancement operation upon the input frame, and transmit the output frame to the display panel.

According to a second aspect of the present invention, an exemplary video processing method is disclosed. The exemplary video processing method includes: obtaining device information of a display panel, obtaining an input frame and the device information, configuring an image enhancement operation according to the device information, generating an output frame by performing the image enhancement operation upon the input frame, and transmitting the output frame to the display panel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
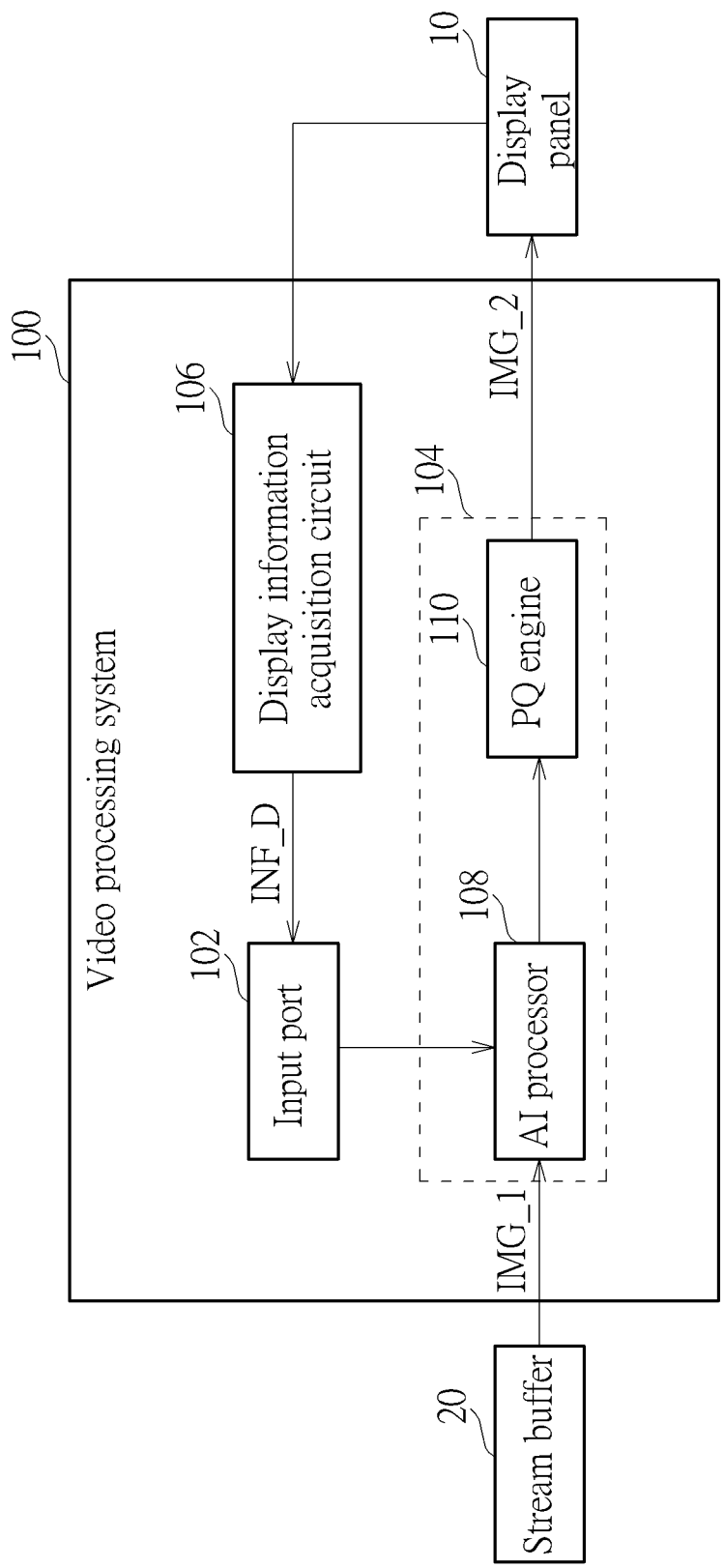
FIG. 1 is a block diagram illustrating a first video processing system according to an embodiment of the present invention.

FIG. 1 is a block diagram illustrating a first video processing system according to an embodiment of the present invention. The video processing system 100 includes an input port 102, a video processing circuit 104, and a display information acquisition circuit 106 The video processing circuit 104 includes an artificial intelligence (AI) processor 108 and a picture quality (PQ) engine 110, and the display information acquisition circuit 106 may act as a display measurement unit that is used to acquire signals representing measurement results of the display panel 10. In some embodiments of the present invention, the input port 102 and the video processing circuit 104 may be implemented in one chip, and the display information acquisition circuit 106 may be implemented in another chip. In some embodiments of the present invention, the input port 102, the video processing circuit 104, and the display information acquisition circuit 106 may be implemented in a system on a chip (SoC). In some embodiments of the present invention, the input port 102 and the video processing circuit 104 may be implemented in a source device, and the display information acquisition circuit 106 may be implemented in a destination device. In some embodiments of the present invention, the input port 102, the video processing circuit 104, and the display information acquisition circuit 106 may be implemented in the same electronic device. However, these are for illustrative purposes only, and are not meant to be a limitation of the present invention. In practice, any video processing system using the proposed AI assisted PQ enhancement falls within the scope of the present invention.

The display information acquisition circuit 106 is arranged to automatically obtain device information INF_D of a display panel 10 without user intervention, and transmit the device information INF_D of the display panel 10 to the input port 102. For example, the display panel 10 may be a display screen of a smart television. For another example, the display panel 10 may be a display screen of a smart phone. It should be noted that the display information acquisition circuit 106 may be optional. Any means capable of feeding the device information INF_D of the display panel 10 into the input port 102 may be employed by the video processing system 100.

The video processing circuit 104 is arranged to obtain an input frame IMG_1 from a stream buffer 20 and obtain the device information INF_D from the input port 102, configure an image enhancement operation according to the device information INF_D, generate an output frame IMG_2 by performing the image enhancement operation upon the input frame IMG_1, and transmit the output frame IMG_2 to the display panel 10 for video playback. For example, the device information INF_D referenced by the video processing circuit 104 may include a panel resolution, a maximum bits level, and/or a supply voltage level.

In one exemplary design, the stream buffer 20 may be a frame buffer implemented using a dynamic random access memory (DRAM) for buffering a whole frame. Hence, the stream buffer 20 may start outputting pixels of the input frame IMG_1 after the input frame IMG_1 is fully available in the stream buffer 20. In another exemplary design, the stream buffer 20 may be a line buffer implemented using a static random access memory (SRAM) for buffering one or more pixel lines of a frame. Hence, the stream buffer 20 may start outputting pixels of the input frame IMG_1 after the input frame IMG_1 is partially available in the stream buffer 20. However, these are for illustrative purposes only, and are not meant to be limitations of the present invention.

In this embodiment, the video processing circuit 104 employs an AI-assisted PQ enhancement scheme with one input parameter being the device information INF_D of the display panel 10. Hence, the AI processor 108 is arranged to refer to the device information INF_D of the display panel 10 to configure the image enhancement operation through deep learning. For example, the AI processor 108 may include a convolution accelerator, or may be a part of a graphics processing unit (GPU). The PQ engine 110 is arranged to perform the rest of the image enhancement operation (which may be adaptively adjusted by the AI processor 108 in response to the time-varying device information INF_D) for generating the output frame IMG_2 that is a PQ enhanced version of the input frame IMG_1. The PQ engine 110 is used to deal with PQ enhancement. For example, PQ enhancement functions supported by the PQ engine 110 may include a de-noise function, a scaling function, a contrast adjustment function, a color adjustment function, a sharpness adjustment function, etc.

Figure 2:
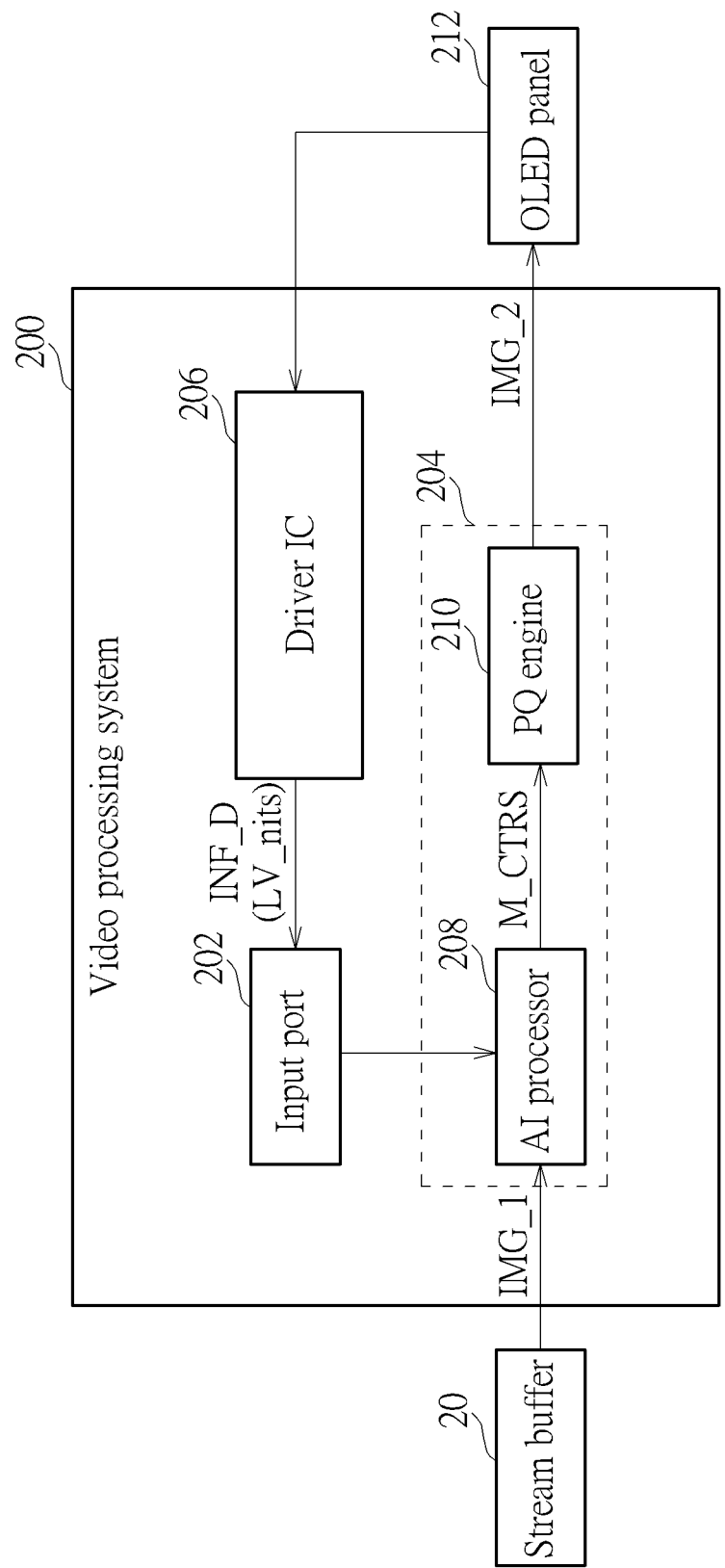
FIG. 2 is a block diagram illustrating a second video processing system according to an embodiment of the present invention.

FIG. 2 is a block diagram illustrating a second video processing system according to an embodiment of the present invention. The architecture of the video processing system 200 is based on that of the video processing system 100, where the display panel 100 is implemented by an Organic Light-Emitting Diode (OLED) panel 212, and the display information acquisition circuit 106 is a part of a driver integrated circuit (IC) 206 of the OLED panel 212. In this embodiment, the driver IC 206 monitors a use time of the OLED panel 212 and a maximum nit level of the OLED panel 212. The device information INF_D of the OLED panel 212 that is transmitted from the driver IC 206 to the input port 202 includes a maximum nit level LV_nits of the OLED panel 212. It should be noted that, due to inherent characteristics of the OLED panel 212, the maximum nit level LV_nits of the OLED panel 212 decreases when the use time of the OLED panel 212 increases. Hence, the maximum nit level LV_nits of the OLED panel 212 is a time-varying parameter that is automatically obtained by the driver IC 206 and then provided to the video processing circuit 204 via the input port 202. The AI processor 208 of the video processing circuit 204 adaptively adjusts a contrast enhancement model M_CTRS according to the maximum nit level LV_nits of the OLED panel 212. The PQ engine 210 of the video processing circuit 204 deals with PQ enhancement, and generates the output frame IMG_2 by applying image enhancement (e.g., contrast enhancement) to the input frame IMG_1 according to the adaptively adjusted contrast enhancement model M_CTRS.

Figure 3:
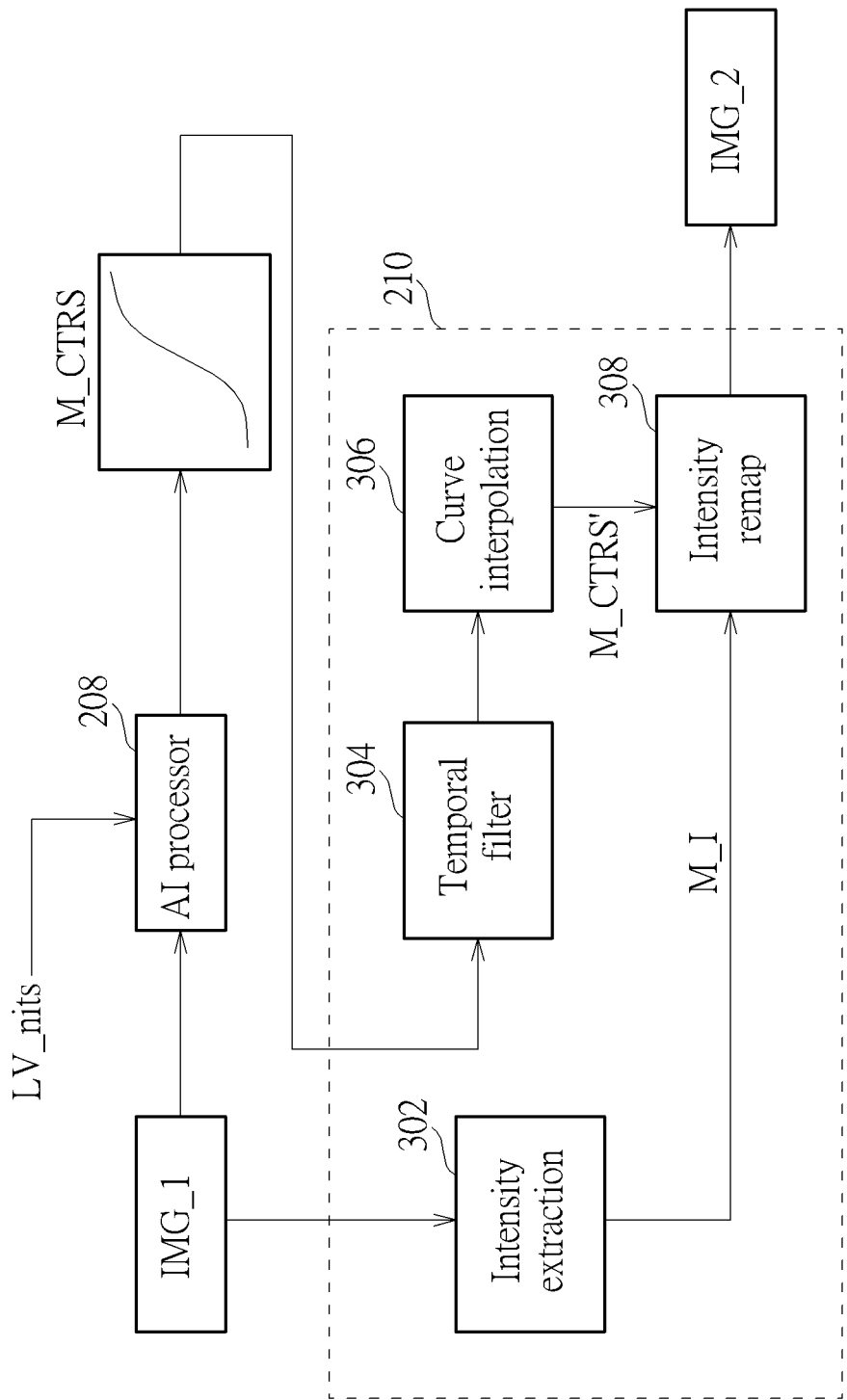
FIG. 3 is a diagram illustrating a first AI-assisted image enhancement scheme according to an embodiment of the present invention.

FIG. 3 is a diagram illustrating a first AI-assisted image enhancement scheme according to an embodiment of the present invention. The exemplary AI-assisted image enhancement scheme may be implemented by the video processing system 200 shown in FIG. 2. The PQ engine 210 includes an intensity extraction circuit (denoted by "intensity extraction") 302, a temporal filter 304, a curve interpolation circuit (denoted by "curve interpolation") 306, and an intensity remapping circuit (denoted by "intensity remap") 308. The intensity extraction circuit 302 extracts intensity values (luminance values) of all pixels included in the input frame IMG_1 to generate an intensity map M_I of the input frame IMG_1. The contrast enhancement model M_CTRS that is generated from the AI processor 208 according to the input frame IMG_1 and the maximum nit level LV_nits serves as a coarse curve model. A processed contrast enhancement model M_CTRS' is a fine curve model that is obtained from passing the coarse curve model through the temporal filter 304 and the curve interpolation circuit 306. The contrast enhancement model M_CTRS/M_CTRS' is a tone mapping function. Hence, contrast enhancement can be achieved by using the processed contrast enhancement model M_CTRS'. As shown in FIG. 3, the intensity remapping circuit 308 refers to the processed contrast enhancement model M_CTRS' to adjust intensity values in the intensity map M_I that is later used for setting intensity values of all pixels in the output frame IMG_2. Since the AI processor 208 refers to the maximum nit level LV_nits for adaptively adjusting the contrast enhancement model M_CTRS in a real-time manner, the picture quality of each output frame of the PQ engine 210 can be properly enhanced during the use of the OLED panel 212.

Figure 4:
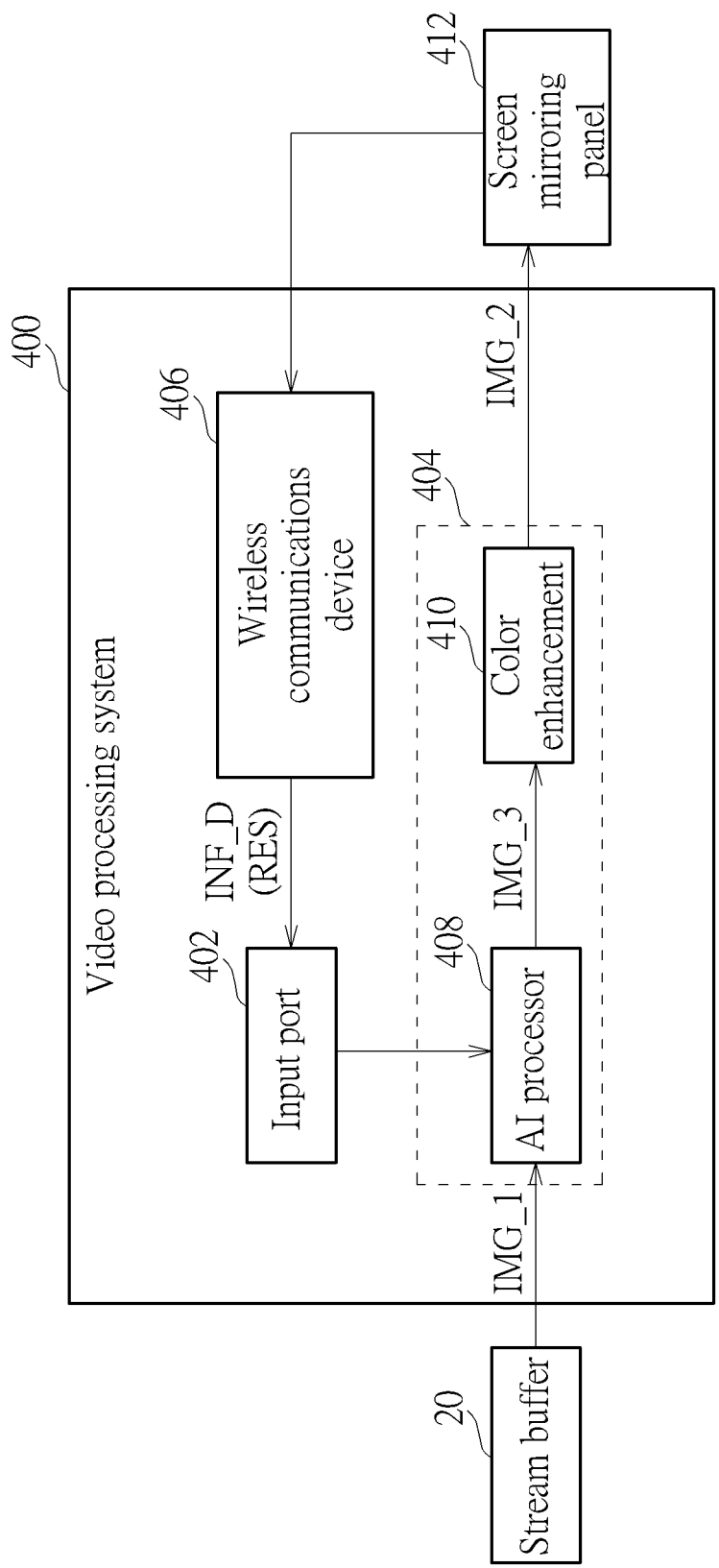
FIG. 4 is a block diagram illustrating a third video processing system according to an embodiment of the present invention.

FIG. 4 is a block diagram illustrating a third video processing system according to an embodiment of the present invention. The architecture of the video processing system 400 is based on that of the video processing system 100, where the display panel 100 is implemented by a screen mirroring panel 412, the PQ engine 110 is implemented by a color enhancement engine (denoted by "color enhancement") 410, and the display information acquisition circuit 106 is a part of a wireless communications device 406. For example, the screen mirroring panel 412 is a display screen of a television, and the video processing system 400 is implemented on a mobile device such as a cellular phone or a tablet. The wireless communications device 406 may be a Wireless Fidelity (Wi-Fi) device or a Bluetooth (BT) device, depending upon a wireless connection established between a source device (e.g., mobile device) and a destination device (e.g., television) for screen mirroring.

In this embodiment, the wireless communications device 406 is further used for obtaining the hardware specification of the screen mirroring panel 412, where the hardware specification includes a panel resolution. The device information INF_D of the screen mirroring panel 412 that is transmitted from the wireless communications device 406 to the input port 402 includes a resolution RES of the screen mirroring panel 412. It should be noted that the device information INF_D obtained by the wireless communications device 406 changes when the source device (e.g., mobile device) is wirelessly connected to another destination device (e.g., another television) with a different panel resolution. Hence, a resolution of a screen mirroring panel is not a time-invariant parameter, and is automatically obtained by the wireless communications device 406 and then provided to the video processing circuit 404 via the input port 402. The AI processor 408 of the video processing circuit 404 adaptively adjusts a scaling factor of the input frame IMG_1 according to the resolution RES of the screen mirroring panel 412, and generates a scaled frame IMG_3 as an input of the color enhancement engine 410 of the video processing circuit 404. For example, the AI processor 408 selects a first scaling factor of the input frame IMG_1 when the screen mirroring panel 412 with a first panel resolution is used, and selects a second scaling factor of the input frame IMG_1 when the screen mirroring panel 412 with a second panel resolution is used. The color enhancement engine 410 generates the output frame IMG_2 by applying image enhancement (e.g., color enhancement) to the scaled frame IMG_3 (which is adaptively adjusted by the AI processor 408).

Considering a case where the input frame IMG_1 is a lower-resolution image (e.g., high definition (HD) image) and the screen mirroring panel 412 is a higher-resolution display panel (e.g., full high definition (FHD) panel), the AI processor 408 performs upscaling (super resolution) for generating the scaled frame IMG_3 with a resolution higher than that of the input frame IMG_1. In other words, a resolution of a current image input of the color enhancement engine 410 is adaptively adjusted by the AI processor 408 in response to a resolution of a currently used screen mirroring panel.

Figure 5:
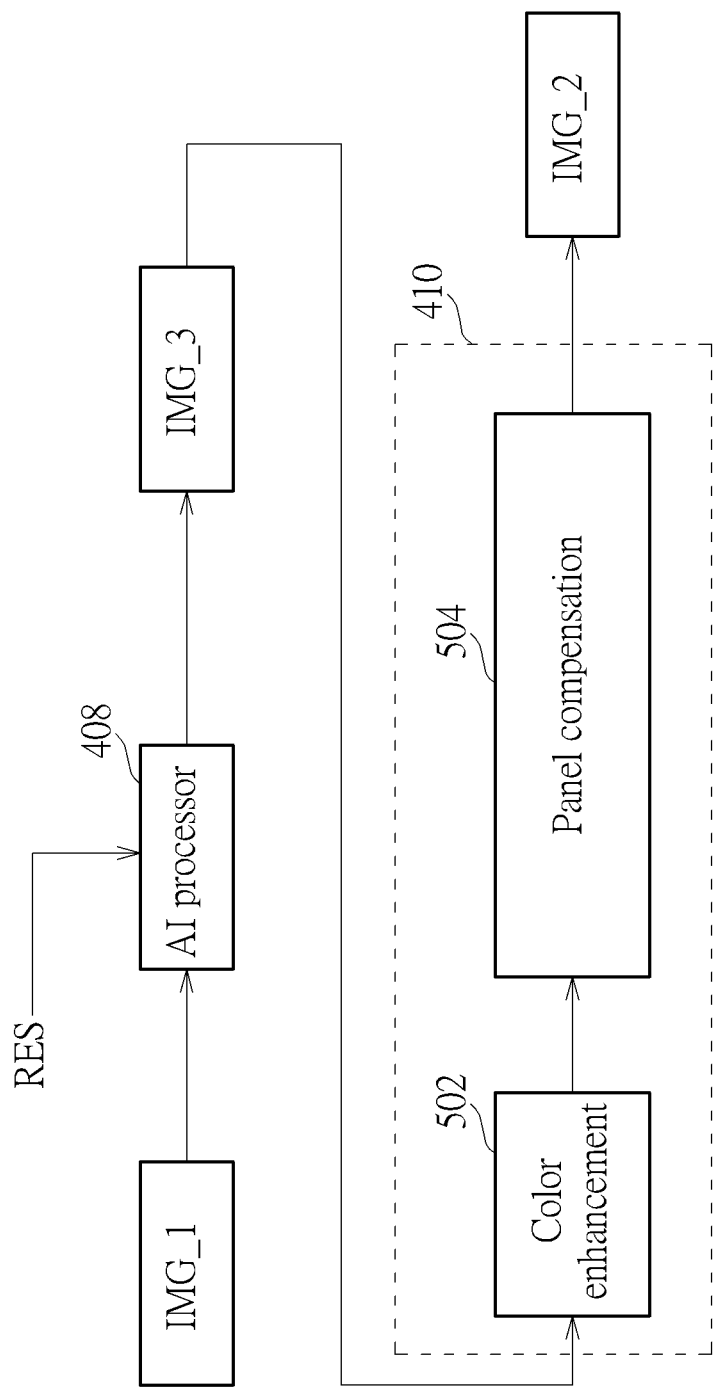
FIG. 5 is a diagram illustrating a second AI-assisted image enhancement scheme according to an embodiment of the present invention.

FIG. 5 is a diagram illustrating a second AI-assisted image enhancement scheme according to an embodiment of the present invention. The exemplary AI-assisted image enhancement scheme may be implemented by the video processing system 400 shown in FIG. 4. The color enhancement engine 410 includes a color enhancement circuit (denoted by "color enhancement") 502 and a panel compensation circuit (denoted by "panel compensation") 504. The AI processor 408 determines a scaling factor according to the resolution RES of the screen mirroring panel 412 and a resolution of the input frame IMG_1, and refers to the scaling factor to apply scaling to the input frame IMG_1 for generating the scaled frame IMG_3. For example, super resolution is performed at the AP processor 408 to generate the scaled frame IMG_3 with a resolution higher than that of the input frame IMG_1.

The color enhancement engine 410 receives the scaled frame IMG_3, and generates the output frame IMG_2 by passing the scaled frame IMG_3 through the color enhancement circuit 502 and the panel compensation circuit 504. Since a resolution of a current image input of the color enhancement engine 410 is adaptively adjusted by the AI processor 408 in response to a resolution of a currently used screen mirroring panel, an image enhancement operation for the input frame IMG_1 is adaptively adjusted by the AI processor 408. Specifically, due to the fact that the AI processor 408 refers to the panel resolution for adaptively adjusting the scaling factor in a real-time manner, the picture quality of each output frame of the color enhancement engine 410 can be properly enhanced under the condition that screen mirroring panels with different resolutions are used at different time instances. For example, the panel compensation circuit 504 adaptively adjusts its compensation setting to compensate for panel imperfection of screen mirroring panels with different resolutions that are used at different time instances. Hence, output frames IMG_2 generated from the panel compensation circuit 504 with a first compensation setting may have optimum picture quality on one screen mirroring panel with a first resolution, and output frames IMG_2 generated from the panel compensation circuit 504 with a second compensation setting may have optimum picture quality on another screen mirroring panel with a second resolution.

Figure 6:
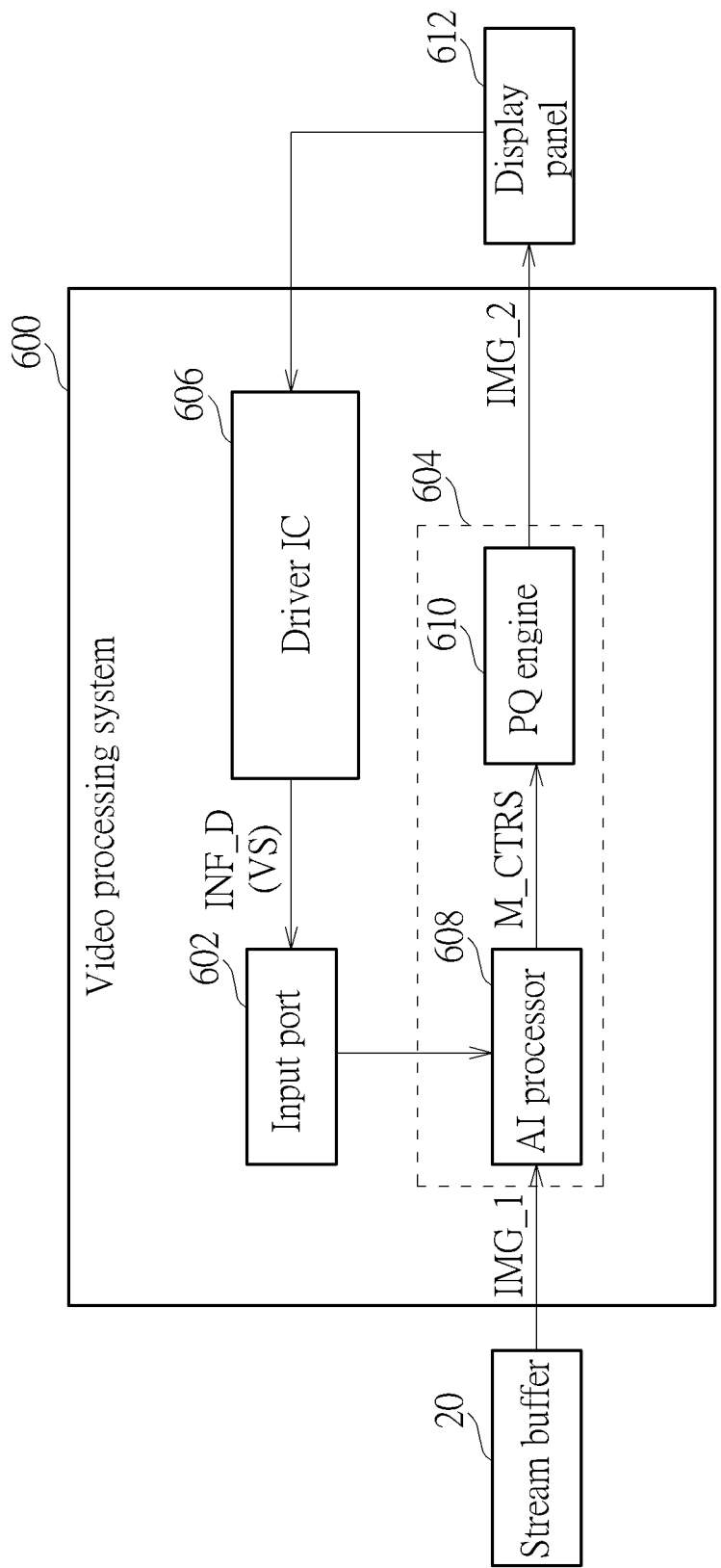
FIG. 6 is a block diagram illustrating a fourth video processing system according to an embodiment of the present invention.

FIG. 6 is a block diagram illustrating a fourth video processing system according to an embodiment of the present invention. The architecture of the video processing system 600 is based on that of the video processing system 100, where the display panel 10 may be implemented by a display panel 612 such as a liquid crystal display (LCD) panel or an OLED panel, and the display information acquisition circuit 106 is a part of a driver integrated circuit (IC) 606 of the display panel 612. The display panel 612 and the video processing system 600 are implemented on a mobile device such as a cellular phone or a tablet. Since the mobile device is powered by a battery, the remaining capacity of the battery decreases during use of the mobile device. In this embodiment, the driver IC 606 monitors a supply voltage of the display panel 612. The device information INF_D of the display panel 612 that is transmitted from the driver IC 606 to the input port 602 includes a supply voltage level VS of the display panel 612. Since the supply voltage level VS is positively correlated with the remaining capacity of the battery, the supply voltage level VS, the power supply level VS of the display panel 612 is a time-varying parameter that is automatically obtained by the driver IC 606 and then provided to the video processing circuit 604 via the input port 602. The AI processor 608 of the video processing circuit 604 adaptively adjusts a contrast enhancement model M_CTRS according to the supply voltage level VS of the display panel 612. The PQ engine 610 of the video processing circuit 604 deals with PQ enhancement, and generates an output frame IMG_2 by applying image enhancement (e.g., contrast enhancement) to the input frame IMG_1 according to the adaptively adjusted contrast enhancement model M_CTRS.

Figure 7:
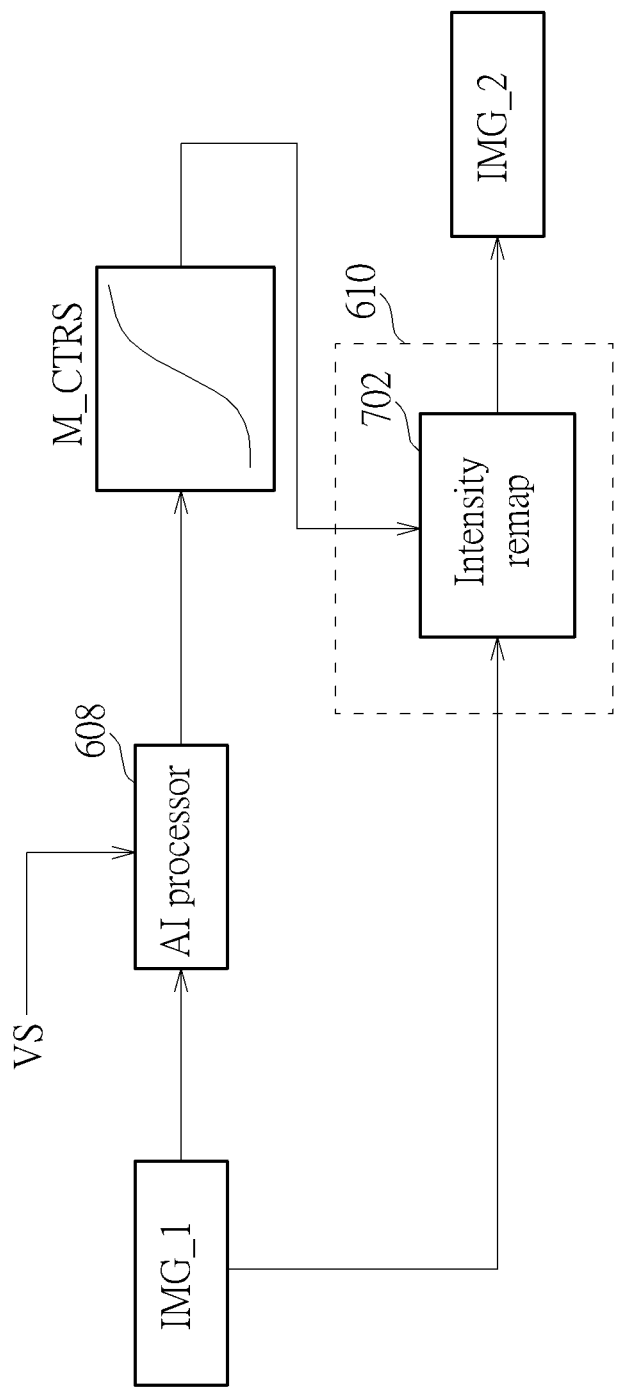
FIG. 7 is a diagram illustrating a third AI-assisted image enhancement scheme according to an embodiment of the present invention.

FIG. 7 is a diagram illustrating a third AI-assisted image enhancement scheme according to an embodiment of the present invention. The exemplary AI-assisted image enhancement scheme may be implemented by the video processing system 600 shown in FIG. 6. The PQ engine 610 includes an intensity remapping circuit (denoted by "intensity remap") 702. The contrast enhancement model M_CTRS is generated from the AI processor 608 according to the input frame IMG_1 and the supply voltage level VS, and is a tone mapping function. Hence, contrast enhancement can be achieved by using the contrast enhancement model M_CTRS. As shown in FIG. 7, the intensity remapping circuit 702 refers to the contrast enhancement model M_CTRS and the input frame IMG_1 to adjust intensity values of some or all pixels in the output frame IMG_2. Since the AI processor 608 refers to the supply voltage level VS for adaptively adjusting the contrast enhancement model M_CTRS in a real-time manner, the picture quality of each output frame of the PQ engine 610 can be properly enhanced under different battery capacity conditions.

Briefly summarized, the proposed AI-assisted PQ enhancement scheme feeds device information of the display panel into the AI processor, such that the display output will be automatically adapted to characteristics of the display panel, and switching between different display panels that share the same PQ engine does not need manual re-calibration of the PQ engine.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing system comprising:
   an input port, arranged to obtain device information, wherein the device information is information of a coupled display panel and is a time-varying parameter; and
   a video processing circuit, arranged to obtain an input frame and the device information, generate an output frame according to the device information, and transmit the output frame to the coupled display panel, the video processing circuit comprising:
      an artificial intelligence (AI) processor, arranged to refer to the device information to configure an image processing model; and
      a picture quality (PQ) engine, coupled to the AI processor, arranged to perform an operation upon the input frame according to the image processing model to generate the output frame;
   wherein the AI processor adaptively adjusts the image processing model in real-time according to the time-varying parameter.

2. The video processing system of claim 1, further comprising:
   a display information acquisition circuit, arranged to automatically obtain the device information of the display panel without user intervention, and transmit the device information of the display panel to the input port.

3. The video processing system of claim 2, wherein the display information acquisition circuit is a part of a driver integrated circuit.

4. The video processing system of claim 2, wherein the display information acquisition circuit is a part of a wireless communications device.

5. The video processing system of claim 4, wherein the wireless communications device is a Wireless Fidelity (Wi-Fi) device or a Bluetooth (BT) device.

6. The video processing system of claim 1, wherein the device information of the display panel comprises a maximum nit level of the display panel.

7. The video processing system of claim 1, wherein the device information of the display panel comprises a resolution of the display panel.

8. The video processing system of claim 1, wherein the device information of the display panel comprises a supply voltage level of the display panel.

9. The video processing system of claim 1, wherein the AI processor is arranged to refer to the device information to configure the image processing model through deep learning.

10. The video processing system of claim 9, wherein the AI processor configures the image processing model by:
    adaptively setting a contrast enhancement model; or
    adaptively setting a scaling factor of the input frame.

11. A video processing method comprising:
    obtaining device information, wherein the device information is information of a coupled display panel and is a time-varying parameter;
    obtaining an input frame and the device information;
    configuring an image processing model according to the device information;
    generating an output frame by performing an operation upon the input frame according to the image processing model; and
    transmitting the output frame to the coupled display panel;
    wherein the image processing model is adaptively adjusted in real-time according to the time-varying parameter.

12. The video processing method of claim 11, wherein the device information of the display panel is obtained automatically without user intervention.

13. The video processing method of claim 12, wherein the device information of the display panel is provided from a driver integrated circuit.

14. The video processing method of claim 12, wherein the device information of the display panel is provided from a wireless communications device.

15. The video processing method of claim 14, wherein the wireless communications device is a Wireless Fidelity (Wi-Fi) device or a Bluetooth (BT) device.

16. The video processing method of claim 11, wherein the device information of the display panel comprises a maximum nit level of the display panel.

17. The video processing method of claim 11, wherein the device information of the display panel comprises a resolution of the display panel.

18. The video processing method of claim 11, wherein the device information of the display panel comprises a supply voltage level of the display panel.

19. The video processing method of claim 11, wherein configuring the image processing model according to the device information comprises:
    referring to the device information to configure the image processing model through deep learning.

20. The video processing method of claim 19, wherein the image processing model is configured by:
    adaptively setting a contrast enhancement model; or
    adaptively setting a scaling factor of the input frame.

* * * * *